(12) United States Patent
Potekhin et al.

(10) Patent No.: US 7,612,793 B2
(45) Date of Patent: Nov. 3, 2009

(54) SPATIALLY CORRELATED AUDIO IN MULTIPOINT VIDEOCONFERENCING

(75) Inventors: Sergey Potekhin, Modeine (IL); Eran Knaz, Rishon LeZion (IL); Sharon Shani, Ra'anana (IL)

(73) Assignee: Polycom, Inc., Pleasanton, CA (US)

( * ) Notice: Subject to any disclaimer, the term of this patent is extended or adjusted under 35 U.S.C. 154(b) by 846 days.

(21) Appl. No.: 11/221,168

(22) Filed: Sep. 7, 2005

(65) Prior Publication Data

US 2007/0064094 A1    Mar. 22, 2007

(51) Int. Cl.
H04N 7/14 (2006.01)
(52) U.S. Cl. .................................. 348/14.01; 381/117
(58) Field of Classification Search ... 348/14.01–14.08; 381/122, 17, 117
See application file for complete search history.

(56) References Cited

U.S. PATENT DOCUMENTS

| | | | | |
|---|---|---|---|---|
| 5,335,011 | A * | 8/1994 | Addeo et al. | 379/206.01 |
| 5,548,346 | A * | 8/1996 | Mimura et al. | 348/14.1 |
| 5,796,843 | A * | 8/1998 | Inanaga et al. | 381/17 |
| 5,889,867 | A * | 3/1999 | Bauck | 381/17 |
| 6,300,973 | B1 | 10/2001 | Feder et al. | 348/14.09 |
| 7,369,100 | B2 * | 5/2008 | Zacks et al. | 345/1.3 |
| 2002/0123895 | A1 | 9/2002 | Potekhin et al. | 704/275 |
| 2002/0188731 | A1 | 12/2002 | Potekhin et al. | 709/227 |
| 2003/0174202 | A1 * | 9/2003 | Eshkoli et al. | 348/14.08 |
| 2005/0069114 | A1 | 3/2005 | Eran | 379/202.01 |
| 2005/0248233 | A1 * | 11/2005 | Pompei | 310/322 |
| 2006/0038794 | A1 * | 2/2006 | Shneidman | 345/173 |
| 2006/0104458 | A1 * | 5/2006 | Kenoyer et al. | 381/92 |
| 2006/0132595 | A1 * | 6/2006 | Kenoyer et al. | 348/14.08 |
| 2007/0110250 | A1 * | 5/2007 | Bauck | 381/17 |
| 2007/0188595 | A1 * | 8/2007 | Ferren et al. | 348/14.08 |

FOREIGN PATENT DOCUMENTS

EP    1505815 A1    9/2005

OTHER PUBLICATIONS

European Search Report dated Feb. 6, 2008.
Richard O. Duda; "Modeling Head Related Transfer Functions;" Preprint for the Twenty-Seventh Asilomar Conference on Signals, Systems & Computers (Asilomar, CA, Oct. 31-Nov. 3, 1993).
U.S. Appl. No. 10/909,446, filed Aug. 2, 2004, Potekhin et al.

* cited by examiner

*Primary Examiner*—Curtis Kuntz
*Assistant Examiner*—Maria El-Zoobi
(74) *Attorney, Agent, or Firm*—Wong, Cabello, Lutsch, Rutherford & Brucculeri LLP

(57) ABSTRACT

The disclosed method provides audio location perception to an endpoint in a multipoint videoconference by providing a plurality of audio streams to the endpoint, wherein each of the audio streams corresponds to one of the loudspeakers at the endpoint. The audio streams are differentiated so as to emphasize broadcasting of the audio streams through one or more loudspeakers closest to a position of a speaking endpoint in a videoconference layout that is displayed at the endpoint. For example, the audio broadcast at a loudspeaker that is at a far-side of the screen might be attenuated or time delayed compared to audio broadcast at a loudspeaker that is located at a near-side of the display. The disclosure also provides a multipoint control unit (MCU) that processes audio signals from two or more endpoints according to the positions in a layout of the endpoints and then transmits processed audio streams to the endpoints in a way that allows endpoints to broadcast spatially correlated audio.

8 Claims, 7 Drawing Sheets

Conferee's Image central location

Conferee's Image central location

SPATIALLY CORRELATED AUDIO IN MULTIPOINT VIDEOCONFERENCING

FIELD OF THE INVENTION

The present invention relates to the field of multimedia multipoint conferencing. More specifically, the present invention relates to a method and apparatus for providing audio location perception in multipoint video conferencing.

BACKGROUND

Multipoint videoconferencing typically involves a number of conferees or endpoints. An endpoint can provide speech; speech and video; or speech, data, and video. In order to present two or more conferees simultaneously, a multipoint control unit (MCU) that conducts the videoconference composes the video images coming from two or more locations into a single layout that is transferred to the different participants. The MCU receives several media channels from access ports. According to certain criteria, the MCU processes audiovisual and data signals and distributes them to the connected channels. Such a composed layout is also referred to as a continuous presence (CP) layout. Examples of MCUs include the MGC-100, which is available from Polycom Inc. Additional information about the MGC-100 can be found at the website of www.polycom.com, which is incorporated herein by reference. A more thorough definition of an endpoint (terminal) and an MCU can be found in the International Telecommunication Union ("ITU") standards such as, but not limited to; the H.320, H.324, and H.323 standards, which are incorporated herein by reference. (The ITU is the United Nations Specialized Agency in the field of telecommunications. Additional information regarding the ITU can be found at the website address of www.itu.int, which is incorporated herein by reference).

Usually the location of the participants in a CP display changes dynamically during a conference, depending on the dynamics of the conference. FIG. 1 illustrates different snapshots of 2×2 layouts during different periods of the conference. A 2×2 layout is a layout in which up to 4 participants out of the total number of current participants are displayed. The number of the current participants can be four or more but at any given moment a maximum four conferees can be displayed. Which conferees are displayed at a given time depends on selection criteria that can be defined when reserving the conference or establishing the conference. For example, one criteria may be that the current loudest four conferees are displayed.

Mixed audio transmitted in a 2×2 layout can include the mixed audio of the 4 displayed participants. Since the four louder conferees can vary, the location on the display dynamically changes due to the dynamics of the conference.

For example, layout 100 is a snapshot during the time in which conferees A, B, C, and D are the loudest conferees and are therefore displayed on the display. Layout 110 is a snapshot of another period in the same conference in which conferee E is louder than B and therefore conferee B is removed from the layout and conferee E replaces her/him. Layout 110 includes conferees A, E, C, and D. Layout 120 is a snapshot in which conferee B is louder than C and therefore conferee C is removed from the layout and conferee B replaces her/him. The above three layouts demonstrate the dynamics of a conference.

In common multipoint conferencing systems the mixed audio is mono and cannot deliver any impression on the location of the image of its source on the screen. However, in order to improve the user experience it is desirable to be able to associate the direction from where a participant's voice can be heard with the location of the participant on the display.

There are few prior art references teaching methods and/or system to create synthetic stereo audio that related to virtual location. For example, U.S. Pat. No. 6,408,327, the entire contents of which are incorporated herein by reference, discloses a method and system for facilitating synthetic stereo audio conferencing of a plurality of users over a local or wide area network. However, the prior art does not provide a video conferencing system in which a mixed stereophonic audio is a function of the location of the talkers over the current conference layout. Therefore, there is a need for improving the experience of multimedia multipoint user by associating a conferee's voice with the location of the conferee on the display.

SUMMARY

The present disclosure provides multipoint videoconferencing wherein the audio broadcast at an endpoint corresponds spatially to the position of the source of the audio, i.e., the speaking endpoint, in a layout displayed at the endpoint. Thus, an endpoint user can enjoy spatially resolved audio, i.e., the audio that a user hears will appear to emanate from the position on a display where the source of the audio is located.

The disclosed method provides audio location perception to an endpoint by providing a plurality of audio streams to the endpoint, wherein each of the audio streams corresponds to one of a plurality of loudspeakers at the endpoint. The audio streams are differentiated so as to emphasize broadcasting of the audio streams through one or more loudspeakers closest to a position of a speaking endpoint in a videoconference layout that is displayed at the endpoint. For example, the audio broadcast at a loudspeaker that is at a far-side of the screen might be attenuated and/or time delayed compared to audio broadcast at a loudspeaker that is located at a near-side of the display.

The disclosure also provides a MCU for receiving and processing audio and video signals from the various endpoints participating in a videoconference. The MCU decodes and processes the audio and video signals and constructs a video layout that is transmitted to the various endpoints. The layout contains images from the video of the various endpoints positioned within the layout. The position of a particular endpoint can change within the layout during the videoconference session depending on the dynamics of the session. The MCU determines which of the endpoints is a source of audio at any given time. This endpoint is herein referred to as the "speaking endpoint." Note that more than one endpoint can be providing audio at a given time, so there can be more than one speaking endpoint. The MCU transmits audio to the various endpoints wherein the audio streams are differentiated so as to emphasize broadcasting of the audio stream through one or more loudspeakers closest to the position in the layout of the speaking endpoint.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 2:
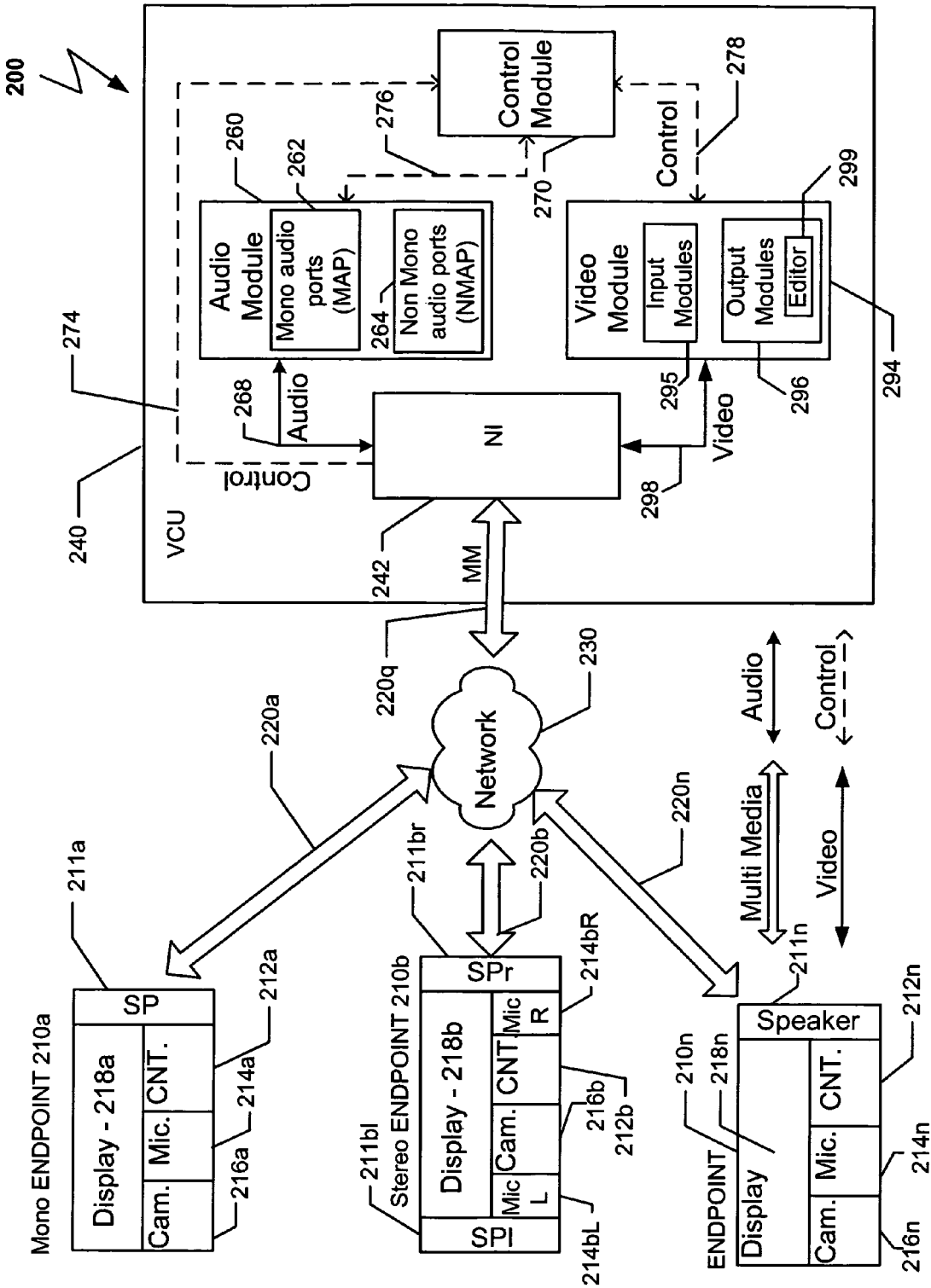
FIG. 2 is a simplified block diagram illustrating elements of a multimedia conferencing system.

An aspect of the disclosure is a videoconferencing system wherein an endpoint user can enjoy spatially resolved audio, i.e., the audio that a user hears will appear to emanate from the position on a display where the source of the audio is located. FIG. 2 is a simplified block diagram illustrating elements in the general topology of a multimedia conferencing system 200. Conferencing system 200 can have a plurality of endpoints 210a-n and multimedia lines 220a-n, respectively. Conferencing system 200 further has a multimedia line 220q, a network 230, and a Video Control Unit (VCU) 240. VCU 240 includes a Network Interface (NI) module 242, an audio module 260 having one or more mono audio ports 262 and one or more non-mono audio ports 264, a control module 270 with control lines 274, 276, 278, compressed video line(s) 298, compressed audio line 268, and a video module 294 having input modules 295, output modules 296. Each of the output modules 296 may include an editor 299.

Control lines 274, 276, 278, video lines 298, audio line 268, and multimedia lines 220a-n and 220q may be lines specially designed for, and dedicated to, carrying control signals, video signals, audio signals, and multimedia signals, respectively. Alternatively, the lines may be constructed from generic cables for carrying signals. Control lines 274, 276, 278, video lines 298, audio line 268, and multimedia lines 220a-n and 220q can carry other signals in addition to signals described in this specification, for example, they can carry optical and/or electrical signals, can be paths of radio waves, or a combination thereof. Each of these lines may actually be a pathway through a complex array of circuitry and/or components through which the corresponding signal travels, or may be a common memory buffer used for exchanging information. In embodiments in which the modules connected by any of these lines are software components, these lines may represent an exchange of information.

The information communicated between the endpoints 210a-n and the VCU 240 includes indicators, control, audio information, video information, and data. The multimedia lines 220a-n convey information to network 230, and multimedia line 220q conveys the information to VCU 240.

Any combination of endpoints 210a-n can participate in any given conference. Endpoints 210a-n may provide speech, data, video, or any combination thereof. Accordingly, each endpoint 210a-n can have user control device 212a-n, one or more microphones 214a-n, cameras 216a-n, displays 218a-n, and one or more loudspeakers 211a-n depending on the type of endpoint. Each of the endpoints 210a-n may contain a different combination of these components. Usually a mono endpoint 210a has one loudspeaker 211a and one microphone 214a-n. A stereo endpoint 210b can have two loudspeakers; 211br on the right, and 211bl on the left, and one or two microphones 214bL & 214bR at the left and right, respectively. Endpoints may have more than two loudspeakers, e.g., four loudspeakers in a quadraphonic system. For example, an endpoint might have a two-dimensional array of speakers.

User control devices 212a-n act as interfaces between the user and the endpoints. The user control devices 212a-n can be a dialing keyboard (e.g. the keypad of a telephone) that uses DTMF signals, a dedicated control device that may use other control signals in addition to DTMF signals, or a far end camera control signaling unit utilizing ITU standards H.224 and H.281, for example. In one embodiment, user control devices 212a-n are keypads, and/or have arrows keys for left, right, up, and down to navigate a cursor on a conference image (i.e., an image associated with a conference) or to shift a position of the conference image. Alternatively, user control devices 212a-n can be software presenting virtual keypads on the displays 218a-n. In yet another embodiment, the user control devices 212a-n may include a DTMF generator such as common keypad of a touch-tone telephone and/or a remote control such as that used for a TV set.

Microphones 214a-n allow users at the endpoints 210a-n to speak within the conference or contribute to the sounds and noises heard by other users. Loudspeakers 211a-n allow the users of endpoints 210a-n to hear the conference. In the case of a non-mono endpoint, such as endpoint 210b, the two or more loudspeakers 211br and 211bl can provide location perception according to the location of the talkers on display 218b. Cameras 216a-n allow endpoints 210a-n to input live video data (such as images of the users associated with endpoints 210a-n or images of exhibits) to the conference. Displays 218a-n allow the conference to be viewed at the endpoints 210a-n. Those endpoints 210a-n that are missing one of the components may be limited in the ways in which they can participate in the conference.

The plurality of endpoints 210a-n are connected via the network 230 to Video Control Unit (VCU) 240. VCU 240 may be an MCU or a media processor, for example. The MCU is a conference controlling entity. In an exemplary embodiment, the MCU is a piece of equipment located at a node of network 230 or in a terminal that receives several channels from access ports and, according to certain criteria, processes audiovisual signals and distributes them to connected channels. An example of an MCU is MGC-100, which is a product of Polycom, Inc. Network 230 may represent a single network or a combination of two or more networks such as Integrated Services Digital Network (ISDN), Public Switched Telephone Network (PSTN), Asynchronous Transfer Mode (ATM), the Internet, and/or an intranet.

The paragraphs that follow often refer to an MCU as an example of the VCU 240 of the present invention. However, a media processor (MP) may be used instead of an MCU, and may be substituted for the MCU in the discussion below.

Network Interface (NI) module 242 may be a logic unit. A logical module or logic unit is a module or unit that performs certain functionality. In this specification the terms logical module, logic unit, and variations of these terms are used interchangeably. A logical module may include one or more elements, which may be hardware and/or software. The logical module may be located in one entity or spread over different entities, such as, but not limited to, a Digital Signal Processing, Printed Circuit Board (DSP, PCB), a processor, or a computer program. NI 242 receives the multimedia communication from a plurality of endpoints 210a-n via the network 230 and processes the multimedia communication according to communication standards such as, but not limited to, H.323, H.321, H.324, Session Initiation Protocol (SIP), and/or H.320. NI 242 delivers audio, video, data, and control streams to the appropriate components of the VCU 240. Some communication standards require that the process of the NI 242 include multiplexing the incoming multimedia communication into audio, video, data, and control streams. When transmitting information to the endpoints 210a-n, NI 242 receives separate streams from the various units of VCU 240, and processes the streams according to the relevant communication standards. NI 242 then transmits the streams via the multimedia line 220q to the network 230, which in turn transmits the streams via the multimedia lines 220a-n to the endpoints 210a-n. More information about communications between endpoints and/or MCUs over different networks, and information describing signaling, control, compression, and how to set up a video call, for example, can be found in the International Telecommunication Union ("ITU") standards H.320, H.321, H.323, H.324, H.324M, H.261 and H.263, H.264, MPEG; or in SIP web site, 3gpp.org. Audio compression standards include G.711, G.722, AMR, AMR-WB, etc.

Audio module 260 receives the compressed audio streams of the plurality of endpoints 210a-n from the NI 242 via audio line 268. The audio module 260 processes the compressed audio streams, may mix the relevant audio streams (originating from the endpoints 210a-n), and sends the compressed mixed signal back to the NI 242 via the audio line 268. Processed audio is sent back to the endpoints 210a-n. The audio streams that are sent to each of the endpoints 210a-n may differ from each other in that the audio streams may be formatted according to different communications standards, according to the needs of the individual endpoints 210a-n. For example, the audio streams may be formatted according to the number of loudspeakers 211a-n that the endpoint has and the current video display, etc. As another example, the audio stream sent to a particular endpoint may not include the voice of a user associated with that endpoint, but the voice may be included in all other audio streams.

An exemplary embodiment the audio module 260 can include, among other modules, at least one mono audio port (MAP) 262, at least one non-mono audio port (NMAP) 264, a compressed audio common interface (CACI) and a decoded audio common interface (DACI). The CACI and DACI are not shown in FIG. 2. The CACI and the DACI are connected to both types of audio ports (MAP 262 and NMAP 264) and carry compressed audio or decoded audio between the different modules of the MAP 262 and NMAP 264. Each one of the MAP 262 or the NMAP 264 is associated with an endpoint, according to the number of loudspeakers at the endpoint. Each audio port grabs encoded audio streams coming from its associated endpoint via NI 242, audio bus 268. The CACI, decodes the grabbed encoded streams and place the decoded stream over the DACI.

Based on received command from the control module 270 and the current state of the conference, one or more appropriate decoded streams, which belong to the different conferees, are grabbed from the DACI. The grabbed decoded streams are processed, mixed, encoded and sent to the associated endpoint via the CACI. Manipulating the selected decoded audio streams depends on the type of the audio port, i.e., whether it is a MAP 262 or NMAP 264. More information on the operation of a MAP 262 can be found in US Patent Publication Nos. 2002/0123895, 2002/0188731, 2005/0069114, and application Ser. No. 10/909,446 the entire contents of which are incorporated herein by reference. More information on NMAP 264 is disclosed below in conjunction with FIGS. 3a & b, 4, & 5.

Control module 270 can be a logic unit that controls the operation of VCU 240. In addition to common operations of a typical MCU, VCU 240 is capable of additional operations as result of having control module 270. Specifically, during setting up a connection with each one of the endpoints 210a-n, the control module 270 may determine which type of audio port will be allocated to the endpoint, how many loudspeaker's channels will be needed by a certain NMAP 264, how to send the two or more encoded streams (one per each loudspeaker), how to split the CACI and the DACI among the different audio streams, etc. During the conference, based on the type of the layout and ongoing information about voice activity of each one of the conferees, the control module 270 may instruct the video modules 290 to change the location of the images of certain conferees in the layout. Accordingly, the location instructions can be transferred also to NMAP 264. Some unique operations of the control module 270 are described in detail below with respect to FIGS. 3a & b, 4 and 5.

Video module 294 can be a logic module that receives and sends compressed video streams. An exemplary video module 294 can include one or more input modules 295 that receive compressed input video streams from participating endpoints and (2) one or more output modules 296 that generate composed compressed output video streams composed from several input streams to form one or more video streams representing the conference based on one or more selected layouts. In FIG. 2 the input modules 295 include at least one video input module, but can include any number of video input modules. For example, there may be one video input module for each of the endpoints 210a-n. Similarly, video output modules 296 can include any number of video output modules. For example, there may be one video output module for each of the endpoints 210a-n. Editor 299 of each video output module produces a display layout that can be individualized to a particular endpoint of the plurality of endpoints 210a-n. The layout and selected conferees in the layout may be controlled dynamically by control module 270. More information on exemplary video module 294 is described in U.S. Pat. No. 6,300,973 and U.S. patent application Ser. No. 10/344,762 and US Patent Publication No. 2003/0174202, the contents of which are incorporated herein by reference.

Figure 3A:
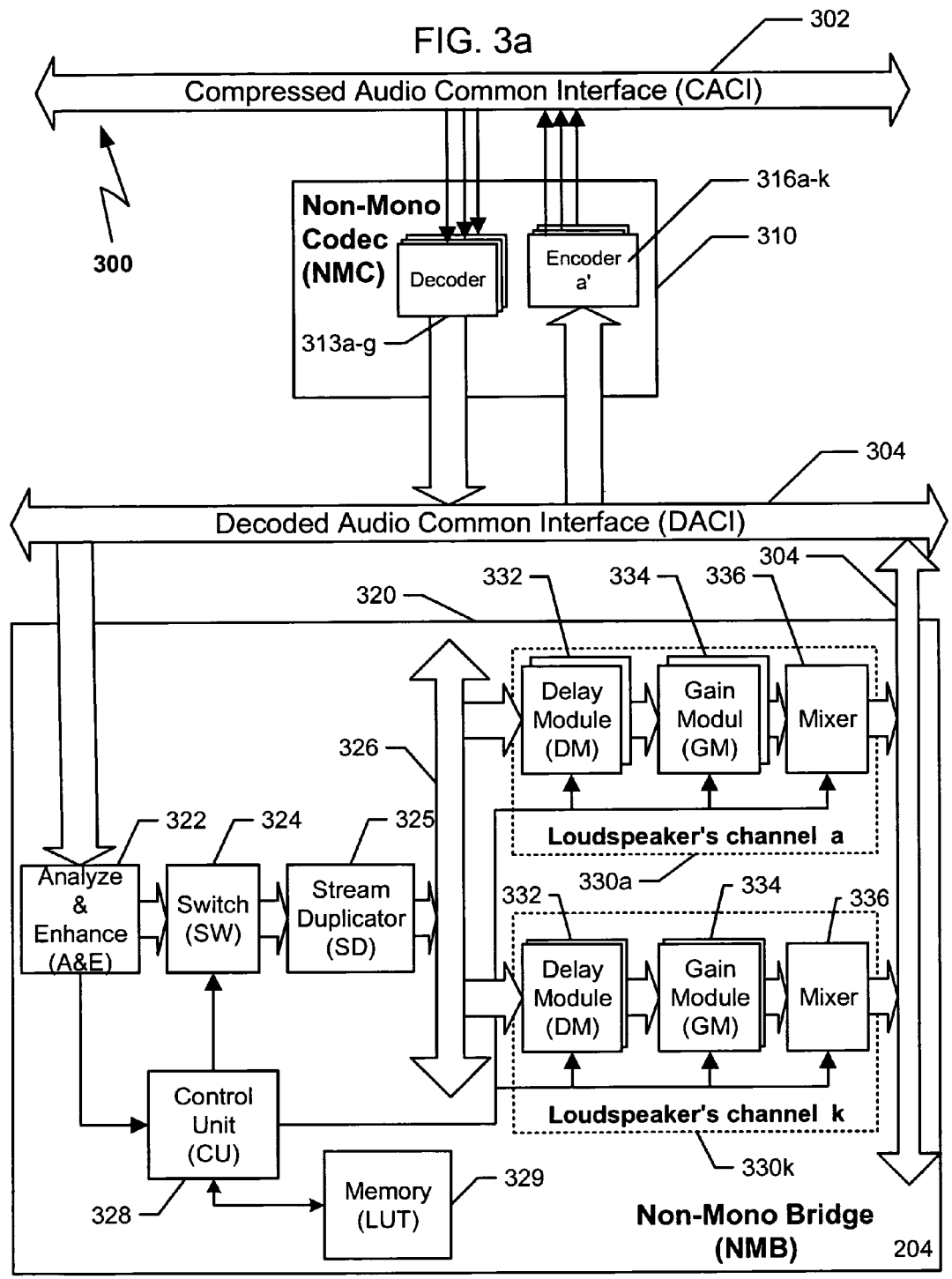
FIG. 3a is a simplified block diagram illustrating elements of a non-mono audio port.

Referring now to FIG. 3a, non-mono audio port (NMAP) 300 can be associated with an endpoint that has two or more loudspeakers 210b (FIG. 2). An exemplary NMAP 300 can utilize, among other modules, a non-mono codec (NMC) 310 and a non-mono bridge (NMB) 320. NMC 310 is connected to CACI 302 and to DACI 304 while NMB 320 is connected to DACI 304. Both units NMC 310 and NMB 320 can be connected (not shown in FIG. 3) to the control module 270 (FIG. 2).

NMC 310 can comprise one or more decoders 313a-g (according to the number of input streams 'g' that are sent by the associated endpoint) and two or more encoders 316a-k according to the number of loudspeakers 'k' that the associated endpoint has. For a stereo endpoint, NMC 310 typically comprise two decoders 313a & b and two encoders 316a & b; for a quadruple endpoint the number of encoders 316a-d is typically four and the number of the decoders can be two 313a & b or four decoders, for example. An exemplary NMB 320 may include an analyze and enhance module (A&E) 322, a switch (selector) 324, a stream duplicator 325, duplicator common interface 326, two or more loudspeaker's channels 330a-k, a control unit (CU) 328 associated with a memory (LUT) 329. The number of loudspeaker's channels 'k' depends on the number of loudspeakers at the associated endpoint. Each loudspeaker's channel can include a delay module (DM) 332, a gain module (GM) 334, and a mixer 336.

CACI 302 and DACI 304 can each be a common interface such as, but not limited to, Time Division Multiplexing (TDM) bus, Asynchronous Transfer Mode (ATM) bus, a packet bus, and/or shared memory. CACI 302 is shared by the plurality of MAPs 262 and/or NMAPs 264 that are used in the audio module 260 (FIG. 2). CACI 302 can be a continuation of audio bus 268 (FIG. 2). CACI 302 carries compressed audio streams between the different endpoints and their associated audio ports, respectively. DACI 304 is shared by the plurality of MAPs 262 and/or NMAPs 264 that are used in the audio module 260 (FIG. 2). DACI 304 carries decoded audio streams between the plurality of the codecs (mono and non-mono) and the plurality of bridges (mono and non-mono). In some exemplary embodiments CACI 302 and DACI 304 may share the same physical resource, for example they can share the same TDM bus or the same shared memory.

During the process of establishing a connection with one of the non-mono endpoints, a NMAP 300 that is adapted to the requirement of the endpoint is associated with the endpoint. The requirement of the endpoints can be the number of loudspeakers, number of audio streams (microphones), or compression parameters, such as but not limited to encoding algorithm, bit rate, etc. Information on the location in the CACI 302 and the DACI 302 that are relevant to the NMAP 302 is transferred to the audio port. The information depends on the type of the CACI and/or DACI. For example, if the common interface is a TDM bus, the information may include the time slots of the relevant encoded and decoded streams. If the common interface is a packet bus the relevant information can include addresses of the relevant sources and destinations of the encoded and decoded streams. For a shared memory common interface, the relevant information may include the addresses of different queues in the shared memory, etc. More information on establishing a connection is disclosed below in conjunction with FIG. 4.

During the conference, one or more decoders 313*a-g* receive encoded audio streams from its associated endpoint via NI 242, audio bus 268 (FIG. 2), and the CACI 302. Decoder 313*a-g* decodes the encoded streams according to the compression algorithm that is used by the associated endpoint. Exemplary audio compression methods include, but are not limited to, G.711, G.723, G.728, G.729, and Motion Picture Expert Group (MPEG) audio compression standards. The one or more decoded streams are placed over the DACI 304 in the slot (address) that was allocated to the relevant decoder 313*a-g*.

An A&E module 322 of NMB 320 receives from DACI 304 the decoded streams that have been created by the different endpoints. A&E module 322 performs a stream analysis on the decoded (or decompressed) audio streams using a set of algorithms for analyzing the decoded audio streams and a stream enhancement algorithm for enhancing their qualities. Exemplary enhancing processes include, for example, Echo canceling according to International Telecommunications Union (ITU) G.165, Dual Tone Multi-Frequency (DTMF) suppression, etc. The functionality of A&E module 322 can be divided between two logical units: the analyze unit and the enhance unit. The stream enhancement creates enhanced audio signals. The stream analysis creates control information such as, but not limited to, VAD (Voice Activity Detection), signal energy, and signal quality measures. Control unit 328 receives the control information from the stream analysis of A&E module 322 and determines which participants (not shown) are currently active. Based on this information, control instructions are created and sent to the control module 270 of the VCU 240 (FIG. 2), switch 324, memory 329, and the different loudspeaker's channels 330*a-k*. If the associated endpoint delivers two or more audio streams, then the enhancing section of the A&E module 322 can be duplicated. Each audio stream may be enhanced by a different enhancing section. Alternatively, analyzer section can combine the two or more decoded streams into one (emulating a mono endpoint) and analyzes the combined stream.

Switch 324 receives control instructions from control unit (CU) 328 and enhanced audio streams from A&E module 322. Based on the control instructions, switch 324 selects and supplies a set number of selected uncompressed audio streams according to a selection decision made by CU 328. The selection decision may be based on different criteria, for example a profile of the conference. The profile may define that a certain conferee will be heard independent on the VAD of his audio stream. Another profile may define that only the loudest talker will be heard or that the streams of the four louder conferees will be selected, etc.

In the case that a selected endpoint 210*b* (FIG. 2) delivers two or more audio streams (left & right, for example), then both streams are selected by switch 324 and duplicated by stream duplicator 325. In the loudspeaker's channels 330*a-k* each stream is processed to emulate the location of the image of the source of the audio that was sent form the endpoint as it is placed in the composed layout.

The selected streams are transferred to stream duplicator (SD) 325 to be duplicated according to the number, 'k', of the loudspeaker's channels. Stream duplicator 325 can be a common interface that is shared by the different loudspeaker's channels 330*a-k*. Each one of the channels 330*a-k* retrieves a duplicated set of audio streams that belong to the selected conferees. The common interface can be a shared memory interface such as a TDM bus, etc.

During the connection establishment with the associated endpoint, CU 328 receives information concerning the number of loudspeakers at the endpoint and the general location of the loudspeakers (right, left, top left, bottom right, etc.), compression algorithm, compression parameters, addresses of (slots) in CACI 302 and DACI 304 of relevant encoded and decoded streams, stream selection criteria for switch 324, a starting video layout, and the starting location of relevant conferees in the starting layout. In addition, CU 328 may receive a set of parameters to create synthetic audio that engages the location on the display and the direction of the source of the audio. The set of parameters depends on the layout and the number of loudspeakers 'k' and their location in reference to the endpoint. The set of parameters can be illustrated by a set of curves, one for amplitude and one for delay, for each one of the loudspeaker's channels 330*a-k*. The sets of parameters (curves) can be stored at the memory (LUT) 329.

Figure 3B:
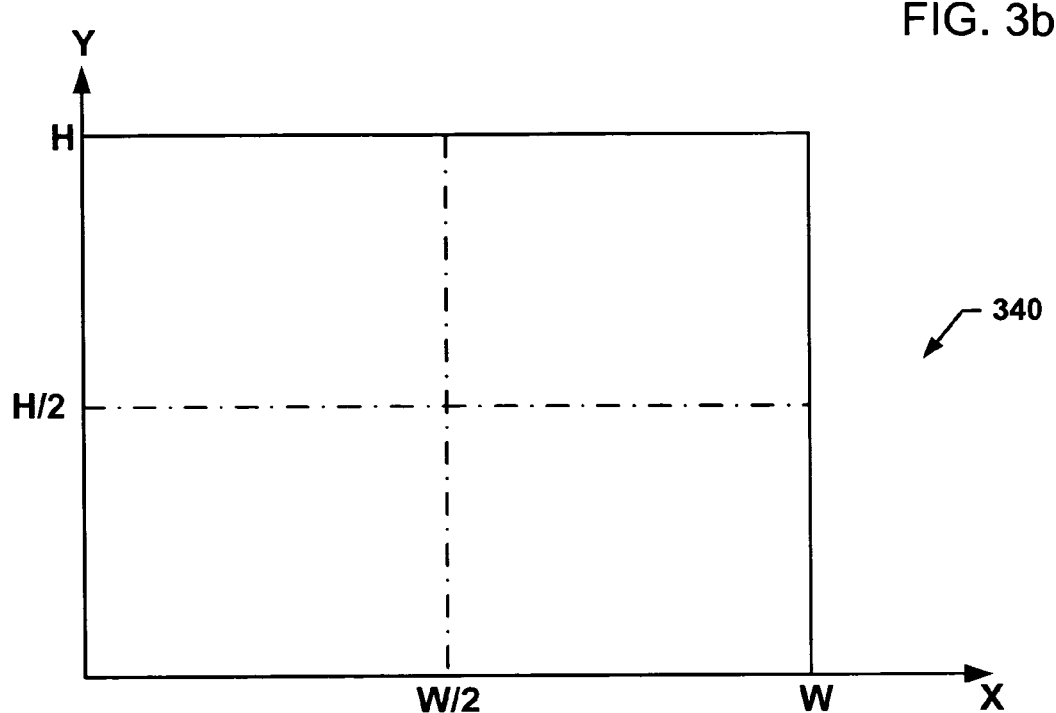
FIG. 3b illustrates an exemplary algorithm (parameters) for creating a synthetic stereophonic effect.
Figure 3B:
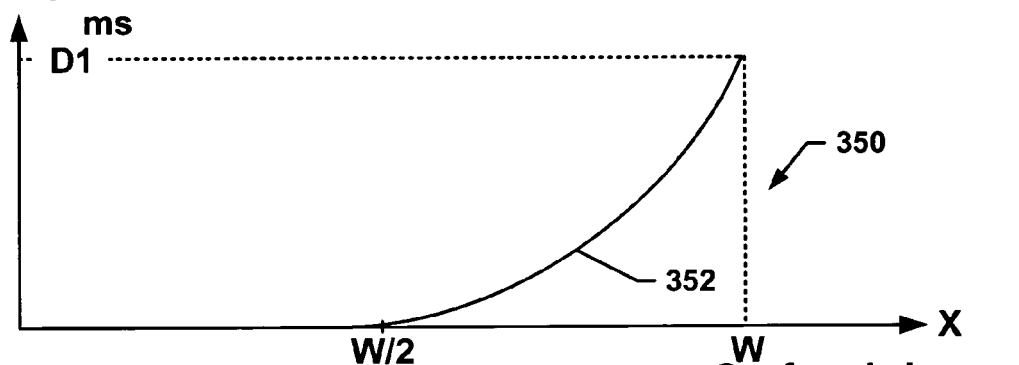
Figure 3B:
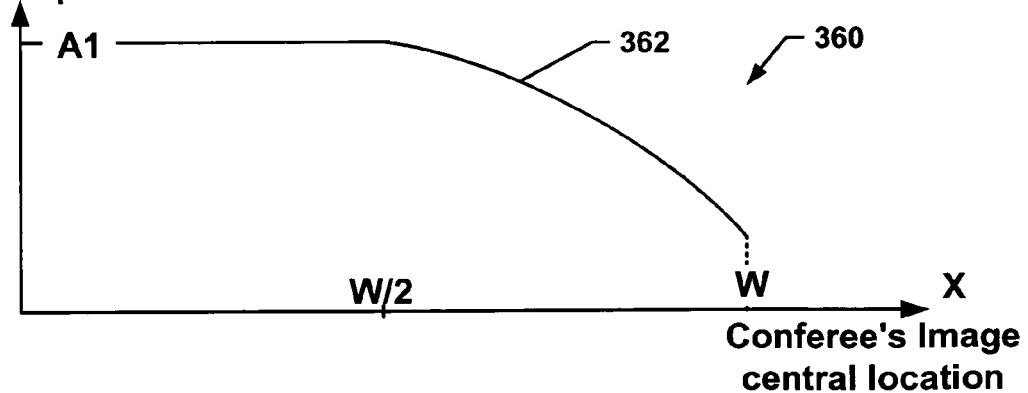

According to one embodiment, creating location perceptions is done by controlling the amplitude and delaying (phase shifting) the audio sent to one loudspeaker compare to the other loudspeaker. The delay and the amplitude depend on the location of the source of the audio in the layout and the location of the loudspeaker (left/right) at the endpoint. An exemplary set of parameters for a stereophonic endpoint is illustrated in FIG. 3*b*. FIG. 3*b* demonstrates the delay and the attenuation of an audio stream sent to mixer 336 of loudspeaker's channel 330*b*, which is associated with the left loudspeaker, compare to the audio stream at the input of the left loudspeaker's channel 330*b*.

In the top section 340 of FIG. 3*b*, a display of an endpoint is placed on X:Y axes. The width of the display is placed on the X-axis and the height of the display is placed on the Y-axis. The size of the display is W:H, respectively. An exemplary set of parameters, for the left loudspeaker's channel 330*b*, that can be used to create location perception is illustrated in 350 and 360 of FIG. 3*b*. A set of symmetrical curves to 350 and 360 around the center, X=W/2, (not shown) can be used for the right loudspeaker's channel 330a. According to the exemplary set of parameters, if the center of the image of a conferee (Xi:Yi) is located in the center, or the left side of the layout (Xi≦W/2), then the amplitude and the delay of it's audio streams remains without changes. The delay is equal to zero and the amplitude is the same amplitude as in the entrance of the left loudspeaker's channel 330b. An audio stream of a conferee who's image is not displayed can be handled as if the center of his image is located at the center of the layout (W/2:H/2).

If the center of the image (Xi:Yi) of a conferee is located in the right side of the layout (Xi>W/2), then the delay of its audio streams increased as illustrated by segment 352. For example, if Xi=¾W, the delay is about ½D1. D1 can be dependent on the endpoint (the location and the distance of the loudspeakers). A common value for D1 can be in the range of about a few milliseconds, for example, about 3 msec, 5 msec, 9 msec, etc. The amplitude can be attenuated according to exemplary curve 362. For example, if Xi=¾W, then the amplitude can be about 70% of the amplitude of the signal of the same conferee at the entrance to the loudspeaker channel 330b.

Other exemplary embodiment of the present invention may implement a "Head related transfer function" for processing the relevant audio streams in order to emulate the location on the display of the source of the audio streams.

If one of the selected conferees delivers stereophonic audio (left input stream and right input stream, input to the MCU), then each stream is duplicated and transferred to each one of the loudspeaker's channels 330a-k. Each loudspeaker's channel processes differently the left duplicated stream and the right duplicated stream. For example, the right duplicated stream in the left loudspeaker's channel 330a may be delayed and attenuated compare to the left duplicated stream and vice versa. In another embodiment (not shown in the drawings) the decoded streams at the output of the two or more decoders 313a-g are combined into one stream emulating a mono input decoded stream. The mono input decoded stream is placed on DACI 304. From this point the input audio from the stereophonic endpoint is handled as a mono input.

An embodiment includes a database with a plurality of different curves 350 and 360 depending on the type of the endpoint. These curves can be prepared in advance at the vendor and/or can be modified by the operator. Another exemplary embodiment may save a bank of different curves that have been prepared and adjusted by users according to their preference in a database. Those curves can be reused in future connection with the relevant endpoints. Because the number of layouts and the number of images in each layout is limited, the number of points in each curve is also limited. Therefore, creating and managing a database with a plurality of curves is achievable.

Other embodiments may control only the amplitude and ignore the delay or control the delay and ignore the amplitude. Other embodiments may use other curves. For example, a set of curves that start influencing the delay and the amplitude from a point other than the center of the display (W/2:W/2), along the entire width of the display, from point 0:0 to W:H, can be used.

If an endpoint has four loudspeakers, i.e., one at each corner of the display, a method may handle the signal to the left couple and the signal to the right couple of loudspeakers as if the endpoint has only two loudspeakers, one in the left side and one in the right side. Then, a decision is made whether to use the top loudspeaker or the bottom one or both. The decision can be based one the value of Hi. If Hi>H/2, then the top loudspeaker can be used and the gain of the signal to the bottom loudspeaker is set to zero. If Hi<H/2, then the bottom loudspeaker can be used and the gain (in the relevant GM 336) of the signal to the top loudspeaker is set to zero. If Hi=H/2, then both loudspeakers are used and the gain of the signal to the top loudspeaker is equal to the gain of the signal to the bottom one. Other exemplary embodiments may use other method for handling four loudspeakers. For example, four loudspeaker's channels 330a-d may be used, one for each loudspeaker. Similar set of parameters as illustrated by curves 350 and 360 can be used for the height instead of the width the value of 'W' cab be replaced by 'H'. The axis 'X' may be replaced by 'Y'.

Returning now to the loudspeaker's channel 330a-k in FIG. 3a, delay module (DM) 332 can be a set of first in first out (FIFO) memory; one FIFO per each selected stream (for a mono input conferee, 'i', for a stereophonic endpoint it will be two streams 'iL' and 'iR') that was/were selected by switch 324 and duplicated by stream duplicator 325. The read command is delayed compared to the write command. The delay for each FIFO (selected stream, 'i' or 'iL&iR') can be Di or DiL and DiR. The value of Di or DiL and DiR depends on the location Xi:Yi of the center of the image of conferee 'i' in the layout and the associated loudspeaker of the channel 330 (as it is disclosed above in conjunction with FIG. 3b). The value Di or DiL and DiR is/are retrieved from LUT 329 via control unit CU 328 and is/are dynamically changed during the conference when the selected conferee is changed.

Gain module (GM) 334 can be a set of multipliers, one per each selected stream (for a mono input conferee, 'i', for a stereophonic endpoint it will be two streams 'iL' and 'iR') that was/were selected by switch 324 and duplicated by stream duplicator 325. Each selected stream is multiplied by a factor Mi or MiL and MiR. The value of Mi or MiL and MiR depend on the location Xi:Yi of the center of the image of conferee 'i' in the layout and the associated loudspeaker of the channel 330 (as discussed above in conjunction with FIG. 3b). The value Mi or MiL and MiR is/are retrieved from LUT 329 by the CU 328 and is/are dynamically changed during the conference when the selected conferee is changed.

The streams at the output of the GM 334 are grabbed and mixed by mixer 336. The mixed audio of each loudspeaker's channel 330 is placed on DACI 304 in the address (slot) associated with the corresponding channel 330a-k. Each of the encoders 316a-k receives, from DACI 304, decoded mixed streams that were processed and mixed by the corresponding loudspeaker's channel 330a-k and is targeted to the associated endpoint. Manipulation of the different selected streams is based on the location of the associated loudspeaker in the endpoint and the location of the relevant audio source in the layout. For example, encoder 316a, which is associated with the right loudspeaker 211br (FIG. 2), receives the decoded mixed stream that has been created by loudspeaker's channel 330a. Loudspeaker's channel 330a processes the selected streams to emulate the location of their sources in the layout as it is to be heard by the user. The above described processing of the audio signals can be generalized as generating audio streams that are differentiated to emphasize broadcasting of the audio stream through one or more loudspeakers closest to the position in the layout of the speaking endpoint.

The encoded stream is placed over CACI 302 in the slot (address) that has been allocated to this stream. In an alternate embodiment (not shown) a MUX may be added to NMC 310. The MUX may collect the two or more encoded streams from encoders 316a-k and deliver one combined encoded stream. The combined encoded stream includes an encoded frame coming from one encoder 316a followed by an encoded frame from the other encoder 316b, for example. The combined encoded stream is placed on CACI 302 at the appropriate time slot (or address).

During the conference, CU 328 can receive a command to replace a certain selected audio source with another. The command can include information on the location of the new audio source in the layout. According to this information, CU 328 can retrieve from LUT 329 a set of values for Di and Mi, one couple of Di and Mi for each one of the loudspeakers 330a-k. Then the appropriate sets are loaded to the DM 332 and GM 334 of each channel 330 in parallel to a command that is sent to switch 324 for selecting the new audio source.

Figure 4A:
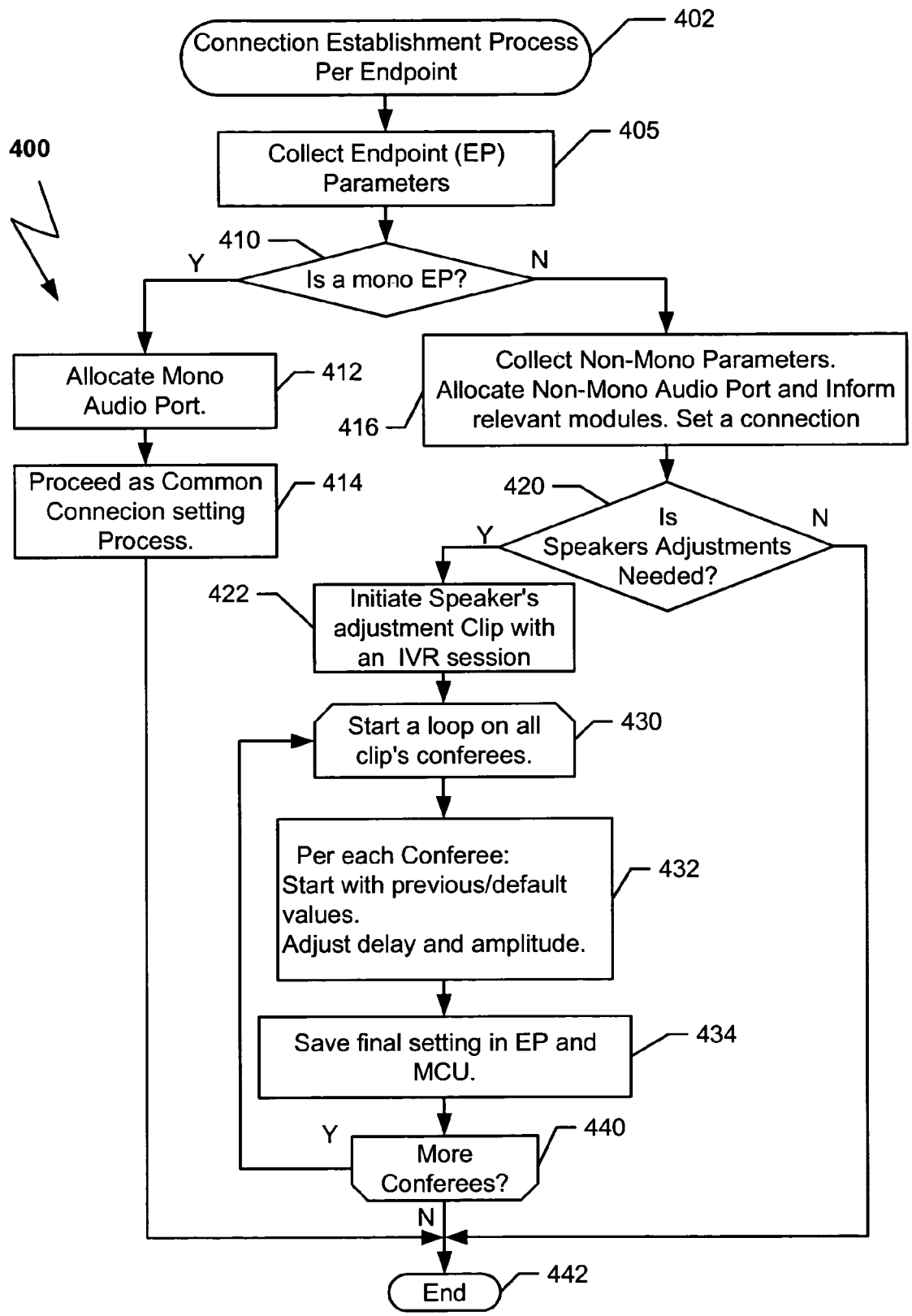
FIG. 4a is a flowchart illustrating the steps in an exemplary method for establishing a connection with an endpoint.
Figure 4B:
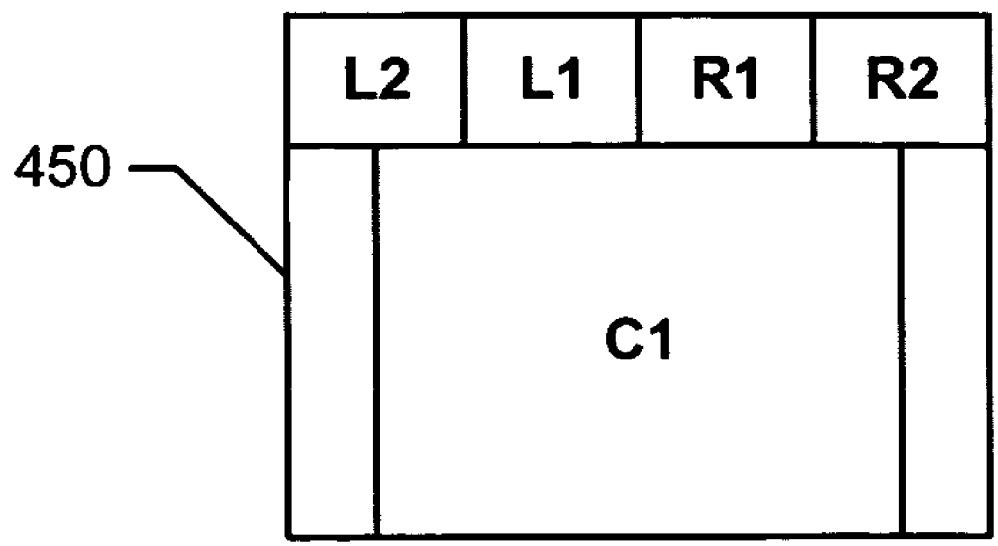
FIG. 4b illustrates example layouts in a video-clip for adjusting the speakers of a non-mono endpoint using an IVR (Interactive Voice Response) session.
Figure 4B:
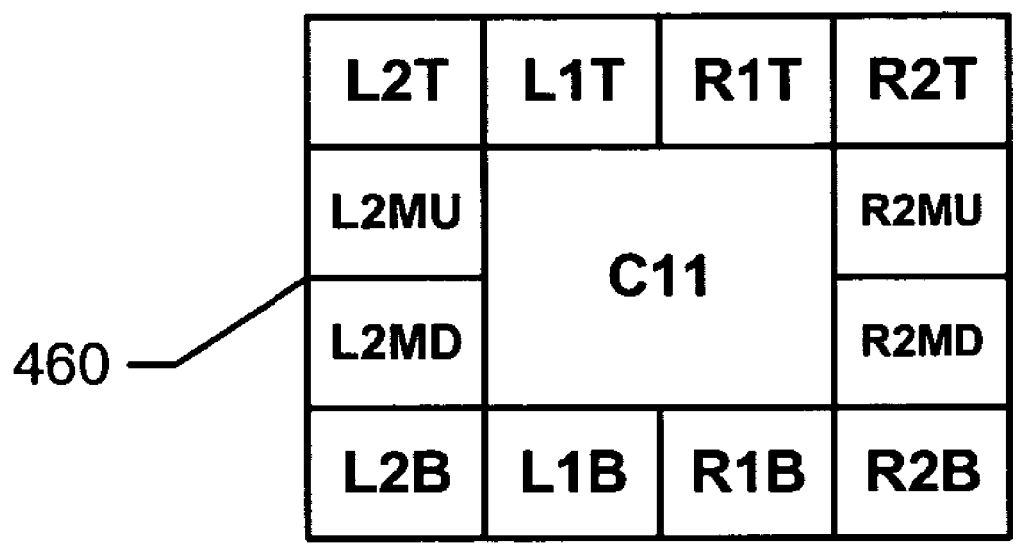

FIG. 4 illustrates a flowchart showing steps in an exemplary method 400 for establishing a connection with an endpoint. Method 400 may be implemented by control module 270 (FIG. 2) and a relevant control unit 328 (FIG. 3). Method 400 may be started 402 upon initiating a connection between the VCU 240 (FIG. 2) and an endpoint 210a-n. Upon initiation, method 400 may retrieve 402 relevant parameters from the endpoint. The parameters may the number of loudspeakers at the endpoint, compression algorithm, number of audio streams that the endpoint sends (i.e. left input audio stream and right input audio stream), etc. A decision is made 410 whether the endpoint is a mono endpoint or non-mono endpoint. If 410 the endpoint is a mono endpoint, a Mono audio port 262 (FIG. 2) is allocated 412 to serve this endpoint and method 400 proceeds 414 in a common connection establishment process. At the end of setting 414 the common connection method 400 terminates.

If 410 the endpoint is a non-mono endpoint, then among other parameters, the VCU collects a set of non-mono parameters 416. The set of non-mono parameters may include the number of loudspeakers, the number of audio streams that the endpoint sends (i.e. left input audio stream and right input audio stream), a preferred stereophonic set of parameters (if it exists), to create synthetic audio that is associated with the location on the display and the direction of the source of the audio, communication protocol for transferring the additional audio streams. An exemplary communication protocol may define that for each frame of compressed audio, the right stream will follow the left stream.

Based on the collected information the control module 270 (FIG. 2) allocates 416 resources of a non-mono audio port to be associated with the endpoint. In addition, a set of slots/address on the CACI 302 and DACI 304 (FIG. 3) may be allocated. The non-mono port can include the appropriate non-mono codec 310 and appropriate NMB 320. Non-mono codec 310 includes a decoder for each input stream and number of encoders. The number of encoders 'k' is equal to the number of loudspeakers of the endpoint. The NMB 310 includes 'k' loudspeaker's channels 330. The encoder type matches the compression standard of the endpoint.

After allocating 416 the appropriate non-mono audio port 300, information on the current layout, stream selection criteria for switch 324 with a preliminary selection of audio streams (conferees), and a preliminary stereophonic set of parameters is loaded to LUT 329 via CU 328. The preliminary stereophonic set of parameters can be selected in different ways. For example, if the VCU has a database that includes a plurality of stereophonic sets of parameters, a set of parameters that is associated with the relevant endpoint, which can be identified by serial number, user name, etc. is searched for. If such a set of parameters exists, it is loaded as the preliminary set of parameters. If such a stereophonic set of parameters does not exist in the database, then a generic stereophonic set of parameters that fits the type of the endpoint can be selected. If such a generic set of parameters does not exist, a default set of parameters that matches the number of loudspeakers is selected and loaded.

Each of the relevant modules (one or more decoder 313a-g, A&E 322, DM 332, and encoders 316a-k) is informed of the addresses/slots on CACI 302 or DACI 304 from or to where relevant audio streams are placed. Based on the information of the location in the layout of each of the selected conferee's streams, the appropriate values of Di (delay) and Mi (gain factor) of each of the selected conferee's streams are loaded into the relevant DMs 332 and GMs 334. Those values are retrieved from the LUT 329 from the locations that are associated with the loudspeaker that is associated with the loudspeaker's channel 330 that includes the relevant DMs 332 and GMs 334. The non-mono audio port is thus ready to start processing the audio coming and sending from/to its associated endpoint.

At 420 a decision is made as to whether a process for adjusting the audio of the different loudspeakers is needed. The decision can be based on the type of the preliminary stereophonic set of parameters that was loaded. If the preliminary stereophonic set of parameters that was selected is associated with the relevant endpoint there is no need for readjusting and method 400 can terminate 442. If the preliminary stereophonic set of parameters is generic, a personalized adjustment may be needed and method 400 proceeds to step 422 for adjusting the different values of Di and Mi.

At step 422 an exemplary adjustment video-clip can be initiated accompanied with an IVR (Interactive Voice Response) session. As used henceforth, video-clip includes for example, an animation. A plurality of video-clips can be stored in a database (not shown) that is associated with the control module 270 (FIG. 2). The video clip demonstrates a videoconference with a plurality of conferees. The layout may depend on the number of loudspeakers that the endpoint has. Referring to FIG. 4b, layout 450 demonstrates an exemplary layout for a stereophonic endpoint with two loudspeakers, one in the left and one in the right. Therefore, layout 450 includes one conferee, C1, at the center and additional four conferees (L1, L2, R1 and R2), two conferees in each side of the display. L1&L2 are located at the left side of the display and R1&R2 at the right side of the display. Other exemplary layouts can be used for adjusting the stereophonic set of parameters. Another example (not shown) can include four conferees in each side. Another exemplary method 400 may use a combination of layouts (not shown). It may start with a coarse setting with one conferee at each side, then with a finer layout with two conferees in each side and may terminate with a finest layout with four conferees in each side. Other exemplary methods may evaluate the values of Di and Mi for intermediate locations (between L1 and L2, for example) by using interpolation between the appropriate values of L1 and L2, or using extrapolation if the center of an image is closer to the center of the display compare to L1 or closer to the left edge compare to L2, for example.

Layout 460 demonstrates an exemplary layout for an endpoint with four loudspeakers, one at each corner of the endpoint. Layout 460 includes one conferee, C11, at the center; two conferees at each side of the top line of the display L1T and L2T are located at the left side of the top of the display and R1T and R2T at the right side of the top of the display; two conferees at each side of the bottom line of the display L1B and L2B are located at the left side of the bottom of the display and R1B and R2B at the right side of the bottom of the display; two conferees at each medium height of the display L2MU located at the left side of the medium of the display and R2MU at the right side of the medium of the display; and L2MD located at the left side of the down medium of the display and R2MD at the right side of the down medium of the display.

Another example (not shown) can include four conferees at each side and each height. Other exemplary layouts can be used for adjusting the set of parameters for four loudspeakers. Another exemplary method 400 may use a combination of layouts (not shown). It may start with a coarse setting with one conferee at each side and height, then with a finer layout with two conferees in each side and height and may terminate with a finest layout with four conferees in each side and height.

An exemplary video-clip is designed in a way that enables easy setting of the parameters in order to match the location on the display and the direction of the voice. An exemplary clip may include a plurality of sessions, wherein each session is dedicated to a certain conferee (location in the layout) during which only the relevant conferee is talking. The session can be looped until an instruction is received from the user. In another exemplary clip an indication may be displayed marking the current speaker. The IVR session that accompanies the video-clip instructs the user and collects his preferences (setting).

After initiating the video clip, a loop is started from step 430 to 440. The loop runs on each one of the conferees in the layout. An exemplary loop for a stereophonic endpoint may start 430 with the conferee in the center, C1. Other exemplary loops may start from the edge to the center. At the beginning of the session of each conferee, the session may start 432 with previous settings of the relevant Mis and Dis, if they exist. If they do not exist, the session can start with a default setting. Then the IVR session informs the user that during this session a certain conferee is going to talk, and instruct the user about the options to adjust the setting that is relevant to this conferee. The user may be instructed to push '3' for increasing the amplitude; '9' for decreasing the amplitude; '1' for increasing the delay; and '7' for decreasing the delay for the appropriate conferee, for example. Upon reaching an appropriate setting the user may push '0' and move to the next conferee or may push '*' to return to previous step, etc.

The user selection may be transferred to the VCU via DTMF signals, for example. Based on that selection the relevant delay (Di) and the relevant multiplier factor (Mi) are recalculated and changed. The relevant Di and Mi are the ones that are associated with the location of the current conferee 'i' in the layout and the appropriate loudspeaker's channel. Step 432 proceeds until an indication that the setting of the current 'i' conferee is satisfying, when '0' is received for example. The final setting 434 is saved. The setting can be saved in the LUT 329 (FIG. 3) to be used during this conference. In parallel the value can be saved in the database that is associated with control module 270 (FIG. 2) to be used in future conferences, or/and in the endpoint to be used for future conferences.

At step 440 a decision is made whether there is a conferee in the layout that was not been adjusted. If yes, method 400 continues the loop and returns to step 430 for handling the next conferee in the layout. If there is no additional conferee, method 400 may be terminated 442. In an alternate embodiment of the present invention, if 440 there are no additional conferees, a question may be placed to the user requesting his decision whether to terminate the loop or to restart it for a finer adjustment or rechecking. Based on the user's decision, method 400 may terminate 442, or method 400 may return to step 430 and start the loop with the setting that was made in the previous loop.

Figure 1:
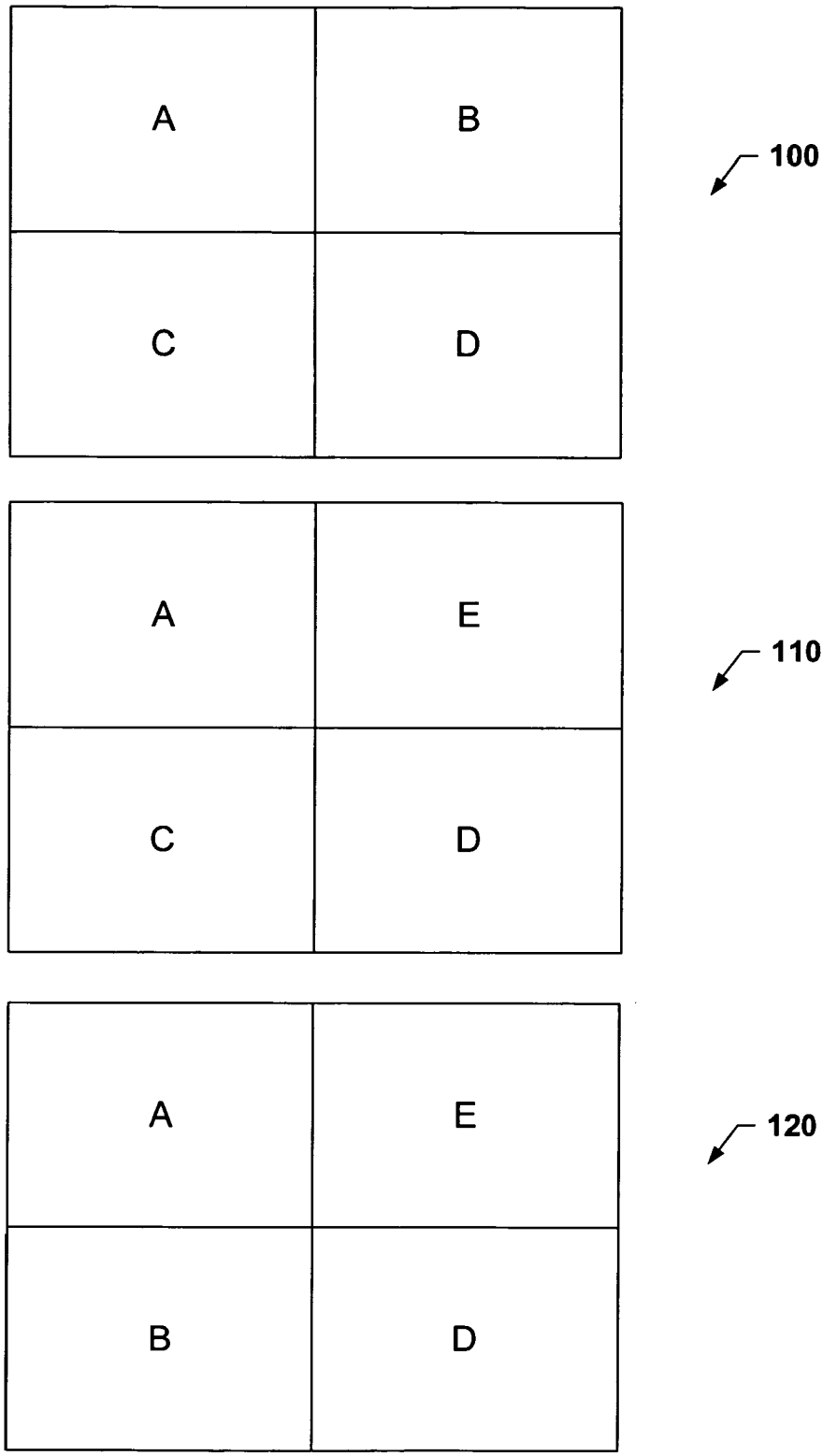
FIG. 1 illustrates changes in the location of different conferees in a videoconference layout during a videoconference session.
Figure 5:
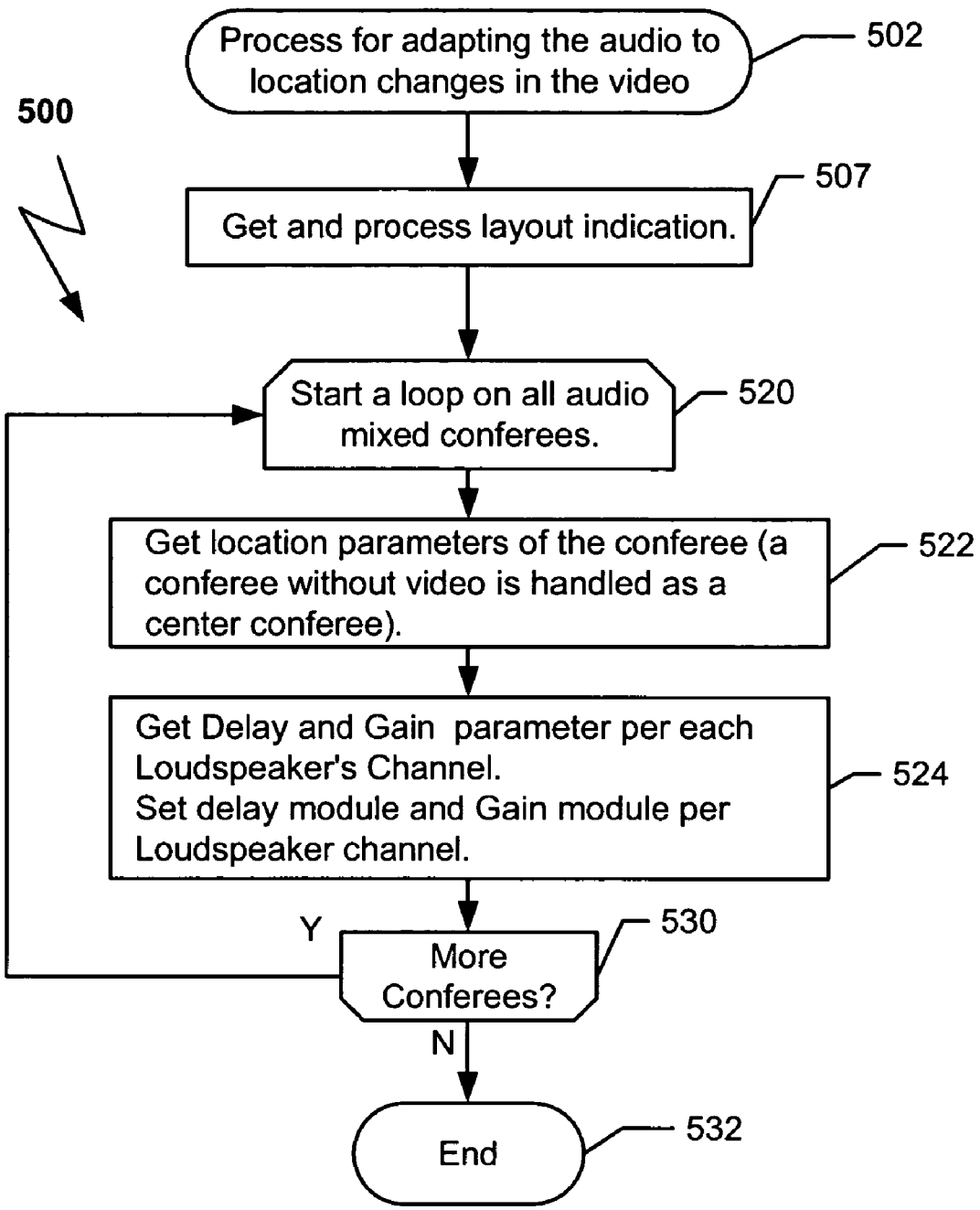
FIG. 5 is a flowchart illustrating the steps in an exemplary method for adapting the location of the sources of the audio to the location changes in the video.

FIG. 5 is a flowchart showing steps in an exemplary method 500 for adapting the location of the sources of the audio to changes in the layout that occur during the conference. Method 500 can be initiated 502 upon receiving an indication that a change in the layout was made. The indication may include a new group of conferees and their location on the display (layout) or even a new structure of the layout. The indication can be sent from control module 270 (FIG. 2) to control unit 328 (FIG. 3). For example, the number of conferees that are presented may have changed from four conferees (layout of 2×2 as illustrated in FIG. 1) to layout of five conferees as the structure of layout 450 (FIG. 4*b*). The indication may include also new sets of parameters (curves) for Di and Mi 350&360 respectively (FIG. 3*b*) that match the new structure of the layout. Those set of parameters can replace the previous ones in LUT 329 (FIG. 3). In an alternate embodiment the set of parameters in LUT 329 are not changed, and if the center (Xi:Yi) of a certain conferees 'i' does not exist in the LUT 329 then the nearest one or two locations to Xi and Yi are retrieved from LUT 329 and the values of Di and Mi are evaluated using interpolation or extrapolation depending on the location of the one or two nearest points compare to Xi and Yi. Other methods can use the value of the nearest location to Xi and Yi that exist in the LUT 329.

At step 520 a loop can be started for each one of the conferees that has been selected via switch 324 (FIG. 3) to be mixed. The selection criteria may or may not be dependent on the current layout. Exemplary selection criteria are disclosed above. The center location Xi:Yi of the current conferee in the loop is retrieved 522 from the information that was received with the instruction about the changes in the layout. If the current conferee in the loop is currently not displayed, then method 500 refers to the location of this conferee as in the center of the layout. Therefore, the center location of a non-displayed conferee is Xi=W/2 and Yi=H/2.

Based on the Xi&Yi of the image in the current layout of the current conferee in the loop, the appropriate Di and Mi for each one of the loudspeaker's channel 330*a*-*c* (FIG. 3) are retrieved from LUT 329 (FIG. 3), or evaluated based on one or more nearest values that are retrieved from the LUT. The values of Di and Mi are loaded 524 to the appropriate delay module 332 (FIG. 3) and gain module 334 (respectively) that handle the stream of conferee 'i' in each one of the loudspeakers 330*a*-*c*.

After setting the values Di and Mi of all the loudspeaker's channels 330*a*-*c*, a decision is made 530 as to whether there are more conferees in the loop whose loudspeaker's channels need to be set. If yes, the method 500 continues the loop and return to step 520 for handling the setting of Di+1 and Mi+1 in each loudspeaker's channel 330*a*-*c* for the next conferee 'i+1'. If 530 there are no more conferees that require setting, then method 500 terminates 532 and the NMB 320 (FIG. 3) is set and ready to deliver synthetic non-mono mixed audio that gives a location perception to the voice according to the current location on the layout, display.

Those skilled in the art will appreciate that the present disclosure can be implemented in the form of additional software residing in the MCU for performing the methods disclosed herein, additional hardware added to the MCU, or additional software or hardware distributed among the MCUs.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The described embodiments comprise different features, not all of which are required in all embodiments of the invention. Some embodiments of the present invention utilize only some of the features or possible combinations of the features. Different combinations of features noted in the described embodiments will occur to persons skilled in the art.

What is claimed is:

1. A method for controlling a first endpoint having a plurality of loudspeakers spatially arranged with respect to a screen in a multipoint videoconference between the first endpoint and a plurality of endpoints, comprising:

receiving at a multipoint control unit compressed audio and video image signals from the first endpoint and the plurality of endpoints;

decoding the audio and video image signals;

assessing from the audio signals which of the plurality of endpoints comprises a speaking endpoint;

generating a video layout for the first endpoint, the layout positioning video images from two or more of the plurality of endpoints at different positions in the layout;

processing one or more of the plurality of decoded audio signals in one or more channels, each channel corresponding to a speaker at the first endpoint, to generate a perception that the audio stream emanates from a position in the layout corresponding to a video image from the speaking endpoint encoding the video layout and the plurality of processed audio signals; and transmitting the encoded signals to the first endpoint.

2. The method of claim 1, wherein the speaking endpoint is not displayed on the screen and wherein the audio streams are differentiated as if the video image from the speaking endpoint is located at the center of the layout.

3. The method of claim 1, wherein the audio streams are differentiated by volume such that an audio stream that is broadcast through a loudspeaker that is further from the position of the video image from the speaking endpoint in the layout is attenuated compared an audio stream that is broadcast through a loudspeaker that is closer to the position of the video image from the speaking endpoint in the layout.

4. The method of claim 1, wherein the audio streams are differentiated such that an audio stream that is broadcast through a loudspeaker that is further from the position of the video image from the speaking endpoint in the layout is delayed compared an audio stream that is broadcast through a loudspeaker that is closer to the position of the video image from the speaking endpoint in the layout.

5. The method of claim 1, wherein the differentiating is adjustable by a user of the first endpoint.

6. The method of claim 1, wherein the position of the video image from the speaking endpoint in the video layout changes during the course of a videoconference.

7. The method of claim 1, further comprising adjusting the loudspeakers of the first endpoint.

8. The method of claim 1, further comprising providing an interactive voice response (IRV) session for adjusting the speakers of the first endpoint.

* * * * *

UNITED STATES PATENT AND TRADEMARK OFFICE
CERTIFICATE OF CORRECTION

PATENT NO. : 7,612,793 B2  Page 1 of 1
APPLICATION NO. : 11/221168
DATED : November 3, 2009
INVENTOR(S) : Potekhin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Nineteenth Day of October, 2010

David J. Kappos
*Director of the United States Patent and Trademark Office*